(12) United States Patent
Brenner et al.

(10) Patent No.: US 12,164,391 B2
(45) Date of Patent: Dec. 10, 2024

(54) MULTIPLE DATA LABELS WITHIN A BACKUP SYSTEM

(71) Applicant: EMC IP Holding Company LLC, Hopkinton, MA (US)

(72) Inventors: Adam Brenner, Mission Viejo, CA (US); Arun Murti, Mission Viejo, CA (US); Mark Malamut, Aliso Viejo, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 80 days.

(21) Appl. No.: 18/080,579

(22) Filed: Dec. 13, 2022

(65) Prior Publication Data

US 2023/0112332 A1    Apr. 13, 2023

Related U.S. Application Data

(63) Continuation of application No. 16/880,285, filed on May 21, 2020, now Pat. No. 11,556,429, which is a continuation-in-part of application No. 16/832,642, filed on Mar. 27, 2020, now Pat. No. 11,550,753.

(51) Int. Cl.
*G06F 16/11*        (2019.01)
*G06F 11/14*        (2006.01)
*G06N 5/025*        (2023.01)

(52) U.S. Cl.
CPC ...... *G06F 11/1469* (2013.01); *G06F 11/1451* (2013.01); *G06F 11/1464* (2013.01); *G06F 11/1466* (2013.01); *G06F 16/119* (2019.01); *G06N 5/025* (2013.01); *G06F 2201/80* (2013.01)

(58) Field of Classification Search
CPC ............... G06F 11/1469; G06F 16/119; G06F 11/1451
See application file for complete search history.

(56) References Cited

U.S. PATENT DOCUMENTS

| 5,819,291 | A | * | 10/1998 | Haimowitz | ......... | G06F 16/9014 |
| | | | | | | 707/999.005 |
| 10,257,147 | B2 | * | 4/2019 | Johnstone | ............... | H04L 67/02 |
| 2008/0319983 | A1 | * | 12/2008 | Meadows | ............. | G06F 16/273 |
| | | | | | | 707/999.005 |
| 2021/0303515 | A1 | * | 9/2021 | Brenner | .............. | G06F 11/1469 |
| 2022/0121531 | A1 | * | 4/2022 | Murti | .................. | G06F 11/1469 |
| 2024/0104456 | A1 | * | 3/2024 | Akiyama | ......... | G06Q 10/06398 |

* cited by examiner

*Primary Examiner* — Loc Tran
(74) *Attorney, Agent, or Firm* — Staniford Tomita LLP (57) ABSTRACT

Embodiments for a method performing data migration such as backups and restores in a network by identifying characteristics of data in a data saveset to separate the data into defined types based on respective characteristics, assigning a data label to each defined type by receiving user selection or automatically merging or selecting a priority label, from among many labels associated with a file, defining migration rules for each data label, discovering assigned labels during a migration operation; and applying respective migration rules to labeled data in the data saveset. The migration rules can dictate storage location, access rights, replication periods, retention periods, and similar parameters.

20 Claims, 9 Drawing Sheets

| Data Label | Naming Regular Expression | Content Regular Expression |
|---|---|---|
| Default | * | * |
| Highly Restrictive | * | ^([1-9])(?!\1{2}-\1{2}-\1{4})[1-9]{2}-[1-9]{2}-[1-9]{4} |
| Internal Use | doc\|docx\|xls\|xlsx\|ppt\|pptx\|txt\|png\|jpg | * |

| Data Label | Rule | Store Locally | Cloud Tier | Replicate | Retention |
|---|---|---|---|---|---|
| Default | No Restrictions | Enabled | Enabled | Enabled | Enabled |
| Highly Restrictive | Retained Forever, No Cloud Tier | Enabled | Disabled | Enabled | Forever |
| Sales | Retain for 1 Year+ | Enabled | Enabled | Enabled | Over One Year |
| Internal Use | Can Cloud Tier | Enabled | Enabled | Enabled | Enabled |
| Project XYZ | Must Replicate and Cloud Store | Disabled | Enabled | Enabled | Enabled |
| Audio | Retain for 1 Year- | Enabled | Enabled | Enabled | Less Than One Year |

FIG. 10

MULTIPLE DATA LABELS WITHIN A BACKUP SYSTEM

CROSS-REFERENCE TO RELATED APPLICATIONS

The present application is a Continuation application claiming priority to U.S. patent application Ser. No. 16/880,285, filed on May 21, 2020, entitled "Multiple Data Labels Within a Backup System," now U.S. Pat. No. 11,556,429 issued Jan. 17, 2023, which is a Continuation-In-Part application claiming priority to U.S. patent application Ser. No. 16/832,642, filed on Mar. 27, 2020, entitled "Data Labeling Awareness for Backup Systems," now U.S. Pat. No. 11,550,753 issued Jan. 10, 2023 and assigned to the assignee of the present application.

TECHNICAL FIELD

This invention relates generally to computer backup systems, and more specifically to systems and methods for labeling data for applying storage and access rules.

BACKGROUND OF THE INVENTION

Backup software is used by large organizations to store virtually all of the data of the organization for recovery after system failures, routine maintenance and so on. Backup sets are typically taken on a regular basis, such as hourly, daily, weekly, and so on, and can comprise vast amounts of data. As organizations and users use different applications to generate and process data, the variety of data can be very vast in terms of type and source. For example, depending on these applications, an organization may generate database data, word processing files, spreadsheet files, audio data, video data, e-mail messages and so on. The data may be transformed into other formats, such as portable document files (.pdf) and may be formatted (e.g., by application or API) or unformatted (e.g., raw sensor data). Regardless of the application or source, present backup software generally treats all data in a data saveset the same way. Any distinction among data in an organization is typically done on a per machine or per user basis rather than on a per file basis. Thus, backup schedules, compression processes, deduplication processes, target allocation, and other backup processes often do not adequately distinguish among different types of source data.

Data labeling has been developed as a technique for customers and machines to tag data based on its characteristics. These characteristics can be file properties such as confidential, public, top secret, customer information, and so on. Such labels are typically employed to restrict or enable access at the point of use, and each characteristic can have different levels of associated attributes. For example, public data can be accessed by everyone and stored anywhere, while top secret data may only be accessed by certain individuals and must be stored on local encrypted storage.

Backup software systems presently do not adequately support data labeling. What is needed, therefore, is a mechanism labeling backup data on a file level to allow for more efficient and granular control of data savesets during backup operations.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve data processing in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a data labeling process for backup software to (1) identify data characteristics of backup files and assign data labels, (2) discover existing data labels, and (3) make decisions based on the data labels, such as how to set policy attributes (e.g., if data could be replicated) or whether SLO (service level objectives) compliance has been met, and so on.

Figure 1:
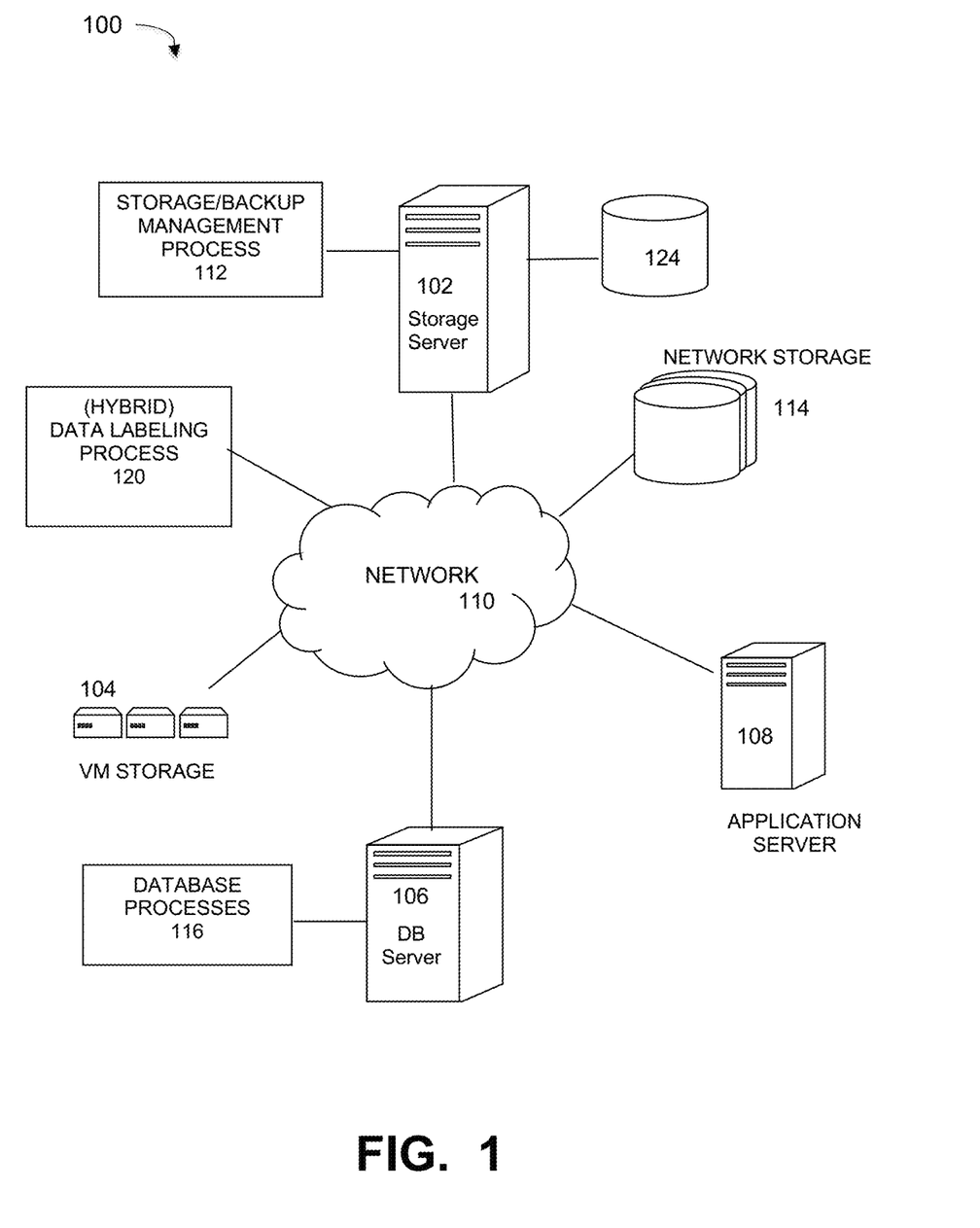
FIG. 1 is a diagram of a cloud computing network implementing data labeling process for backup systems, under some embodiments.

FIG. 1 illustrates a computer network system that implements one or more embodiments of a network data backup system implementing a data labeling process, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, such as application server 102, database server 106, or any other data source, in the network environment. The data sourced by the data source may be any appropriate data, such as database 116 data that is part of a database management system, and the data may reside on one or more hard drives for the database(s) in a variety of formats.

The network server computers are coupled directly or indirectly to the data storage 114, target VMs 104, and the data sources and other resources through network 110, which is typically a public cloud network (but may also be a private cloud, LAN, WAN or other similar network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

Backup software vendors typically provide service under a service level agreement (SLA) that establishes the terms and costs to use the network and transmit/store data specifies minimum resource allocations (e.g., storage space) and performance requirements (e.g., network bandwidth) provided by the provider. The backup software may be any suitable backup program such as EMC Data Domain, Avamar, and so on. In cloud-based networks, it may be provided by a cloud service provider server that may be maintained be any company such as Amazon, EMC, Apple, Cisco, Citrix, IBM, Google, Microsoft, Salesforce.com, and so on.

Users in a large-scale or distributed typically use any number of different applications that generate data in different formats, such as application native formats (e.g., .doc, .ppt, .xls, etc.) or standard format (e.g., .jpeg, .pdf, .mp3, etc.). Backup privileges and restrictions may be defined by user or machine, but are not easily defined based on type of data. Current backup software (e.g., Avamar, Networker and PPDM) do not employ data labels. Backups are part of a policy regardless of what kind of data is within that backup saveset.

Embodiments of the data labeling process 120 allow system administrators or users to define, on a per data label basis, how that data should be protected, in conjunction with the traditional policy definitions and backup workflows. These embodiments allow backup software to discover existing data labels, or come up with its own data labels. Then, based on these data labels, the backup software can enforce or not enforce certain policies on a data labels. As such, process 120 can be used to enhance present backup policies or rules within the backup software 112.

Figure 2:
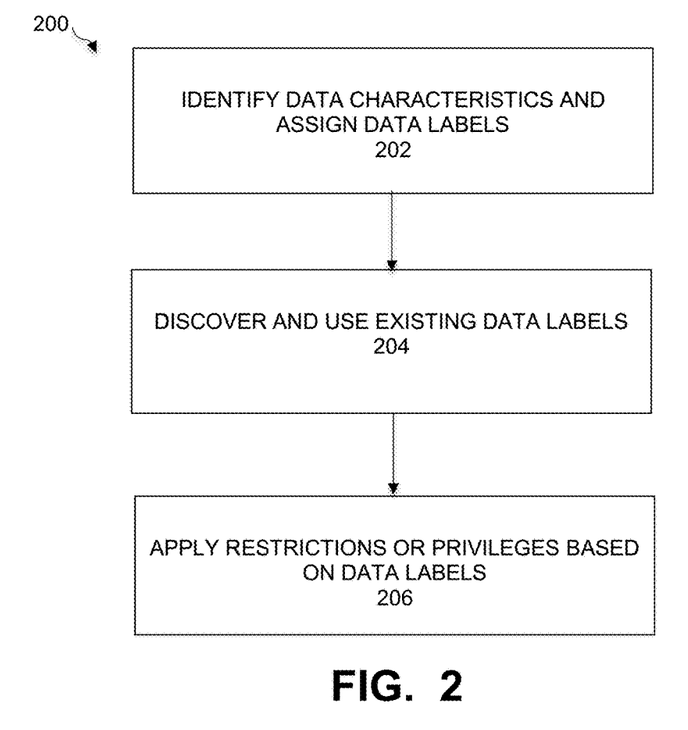
FIG. 2 is a flowchart that illustrates an overall process of labeling data in a backup system, under some embodiments.

FIG. 2 is a flowchart that illustrates an overall process of labeling data in a backup system, under some embodiments. The overall process 200 begins by identifying data characteristics and assigning data labels, 202. Some data in a saveset may be pre-labeled, while others are not pre-labeled. For data that does not have a data label, this step produces and assigns a data label. If data already has a label, the process 120 will discover it, and will not overwrite it but rather use and preserve it, 204.

In order to identify data characteristics, the backup software will perform full content indexing on the data using certain known methods. These methods can include an inline or post-process that reads the content of known data types such as text documents (.txt), Microsoft Word documents (.doc), Microsoft Excel documents (.xls), PowerPoint documents (.ppt), CAD documents (.cad), portable document files (.pdf), and so on, similar to data protection search products operate. For each known data type on which the process performs full content indexing, it can look for different data characteristics that match patterns supplied by the user. These patterns can be well known patterns such as personal identification information (PII) patterns (e.g., Social Security Numbers, phone numbers, addresses, etc.). Alternatively, patterns can be supplied by the user to match their use cases (financial code, algorithms specific to their company, and so on). Characteristics can thus be defined along various different factors, including but not limited to: file type, access, source, age, application, importance, size, and so on.

Besides looking at the content of files using full content indexing, embodiments also take into account file names or file extensions to help classify the data. This is useful to quickly identify and label data without the need of full content indexing. For example, all documents of a commonly used or well-known application may have set naming conventions or identifiers. For example, Microsoft Office documents are part of a popular application suite that can be labeled and treated as a set classification, such as internal use.

Figure 3:
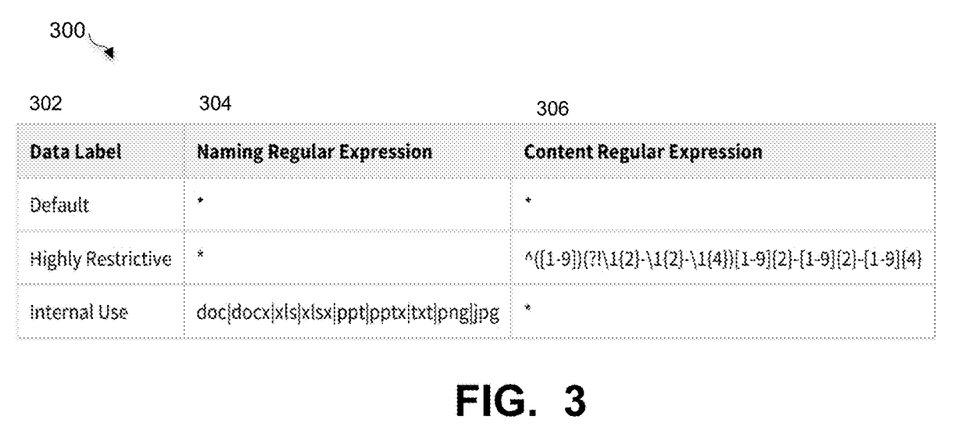
FIG. 3 is a table 300 for assigned data labels, under some embodiments.

In an embodiment, the data labels for the patterns are defined as regular expressions and stored in a database. FIG. 3 is a table 300 for assigned data labels, under some embodiments. As shown in FIG. 3, the regular expression database for the data labels has three columns: column 304 for the regular expression of file names, column 306 for the content regular expression and column 302 for the data label type to assign. The label type 302 can be free-form text that defines the corresponding data, such as: "confidential," "public," "restricted," "highly restricted," "customer information," and so on. Users have the ability to create their own data labels. Once the regular expression data is populated, the backup software 112 will evaluate these expressions. For every match, it will record the file along with the data label in the backup software catalog.

Table 300 provides an example of three user defined rules corresponding to assigned data labels that the data label process 120 and backup software 112 would use. For the example of FIG. 3, the rules for the labels are "Default," "Highly Restrictive," and "Internal Use." These are provided for example only, and any other data label or characteristic and corresponding rules may be used.

As part of the backup process, the backup software 112 will apply the rules described in this table to each file and associate the named data label to each file. For example: the "Highly Restrictive" rule would apply to all files and it would search the content of those files for matches of the regular expression. For the example of FIG. 3, the regular expression corresponds to the format of a Social Security Number "123-45-6789." The data label, "Internal Use" would apply to all files names that match the list provided and not perform any search on the content of the files, and the "Default" data label can be any normal or set file name selected by the user. When conflicts occur within the data labeling process, newer rules take precedence over older rules. Other conflict resolution algorithms can also be used.

In certain cases, files or datasets may already be labeled, such as by an application, system administrator or upstream rules engine. Thus, as shown in FIG. 2, process 200 may discover and use existing data labels, 204. For data that already has data labels, the data labeling process saves them as part of the backup catalog rather than overwrite or replace existing labels. This is to respect the fact that users may choose to use third-party products to assign labels to data. An example would be Microsoft Azure Information Protection labels that can be applied to any Microsoft Office document. These labels can be stored in a number of locations such as extended attributes as part of a filesystem, within each individual file or in a separate database. During a normal backup process, the backup software will discover the existing data labels and use appropriate APIs to add them to its own backup catalog that identifies each file with the corresponding data label.

Figure 4:
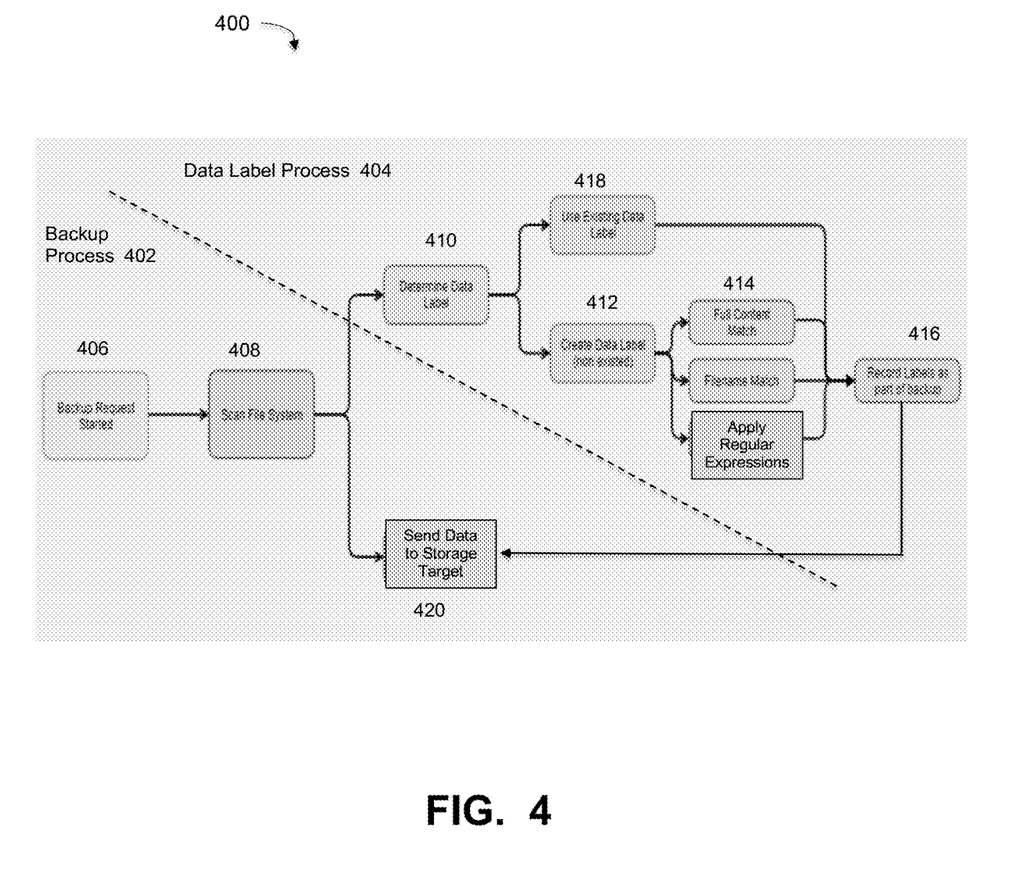
FIG. 4 is a diagram 400 of an overall workflow for a data labeling process in conjunction with a backup process, under some embodiments.

FIG. 4 is a diagram 400 of an overall workflow for a data labeling process in conjunction with a backup process, under some embodiments. Diagram 400 illustrates certain operations performed by the backup software 112 (or 402) and the data labeling process 120 or 404). Process 400 begins with the backup process 402 starting a backup request 406 in response to a user or system command that triggers a backup operation, such as a routine scheduled backup. The backup process then scans the file system. At this point, the data labeling process 404 determines whether or not a data label already exists for the data to be backed up (the saveset), 410. If a label exists, the existing label is used, 418, as described above. If a previous label does not exist, it is created, 412. To create the label, the process in step 414 performs the sub-steps of performing a full content match and/or a filename match, and then looks up the matches in a database. With respect to the operations 414, the full-content match comprises the full content indexing on the data such as the inline or post-process to read the content of known data types, as described above. The filename match process comprises the classification of data using file names or file extensions, as described above. The "apply regular expressions" process comprises using assigned data labels, as described above with reference to FIG. 3. In certain cases, if a certain label was previously assigned to a file, the process can just re-use that label, and that label can be used as an existing data label. The created label is then recorded with the saveset as part of the backup.

The saveset is then sent, 420, along with any other data to the target storage media by the backup process 402. For this embodiment, the output of the data label process 416 is fed back to the backup software so that it can first record the label and apply the appropriate rule to the file being backed up based on that label, and second, the file can be sent to the storage target based on the rules applied. In general, no data is sent to the storage target before the rules are applied.

With reference back to FIG. 2, once the data labels have been collected for each file, certain restrictions, privileges, or other control rules can be applied to the data across the backup system, 206. In an embodiment, the backup software 112 is integrated with a Data Label Rules Engine (DLRE) that executes or performs at least part of the data labeling process 120.

Figure 5:
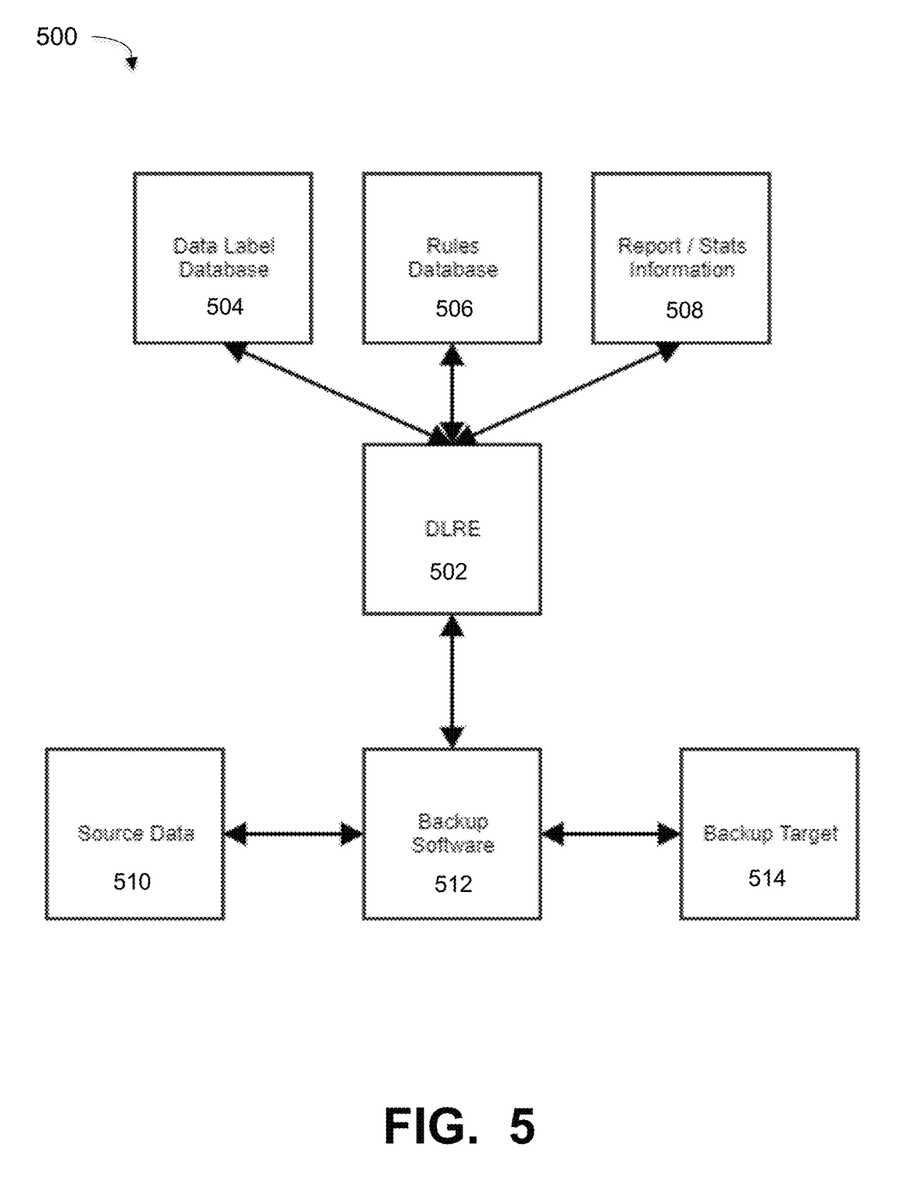
FIG. 5 is a block diagram that illustrates a Data Label Rules Engine in a backup system, under some embodiments.

FIG. 5 is a block diagram that illustrates a Data Label Rules Engine in a backup system, under some embodiments. As shown for system 500 of FIG. 5, DLRE 502 is functionally coupled to the backup software 512 which stores source data 510 in the storage media of one or more backup targets 514. To help determine the appropriate media as well as the proper backup speed, backup period, retention period, access privileges, and so on, the DLRE 502 accesses the data label database 504 to apply the appropriate rules from rules database 506 to the data.

In an embodiment, the DLRE provides reports through a report/statistical information component 508. With respect to this component, the DLRE in conjunction with the backup software component enables a reporting functionality to provide information as to what is the most popular data label, how many data labels were found and if data labels are in compliance. This information is stored within the DLRE, and exposed via APIs to the backup software. The backup software can call these APIs and merge the data with its own to produce a wide number of additional reports.

The backup software 512 for each backup or replication phase, as well as each data tiering or deletion phase would communicate with the DLRE 502 in real time, with no pre- or post-processing. The DLRE, in response to the backup software, would provide a set of rules from the rules database 506 that the backup software would necessarily follow. Such an embodiment can be implemented by the DLRE being called inline during the backup/replication/tiering/deleting phase. Embodiments are not so limited, however, and it can also be called as a pre-process or post-process operation.

For example, presume the backup system identified or discovered files that had a data label of Highly Restrictive. The backup software would communicate with the DLRE. While the backup operation is in progress, and the DLRE would respond with a rule such as: for all highly restrictive files, those files must be retained forever (never deleted) and cannot be stored on publicly accessible storage, such as a Cloud tier. It is up to the backup software to enforce and follow this rule. The DLRE only provides the rules that the backup software should respect.

Another example could be as follows: the backup software 512 communicates with the DLRE 502 that it found no data labels for the saveset. The DLRE would respond back with a rule such as: for all files that do not have any data label, such data can be deleted and can be cloud tiered.

In certain cases, the backup software or system administrator/user may define their own rules or policies for backups. In this case, the system could be configured such that the DLRE would take precedence over any policies that are defined in the backup software if a conflict should occur. It is then up to the backup software to comply with the DLRE, even for situations where there may be conflicting instructions.

Figure 6:
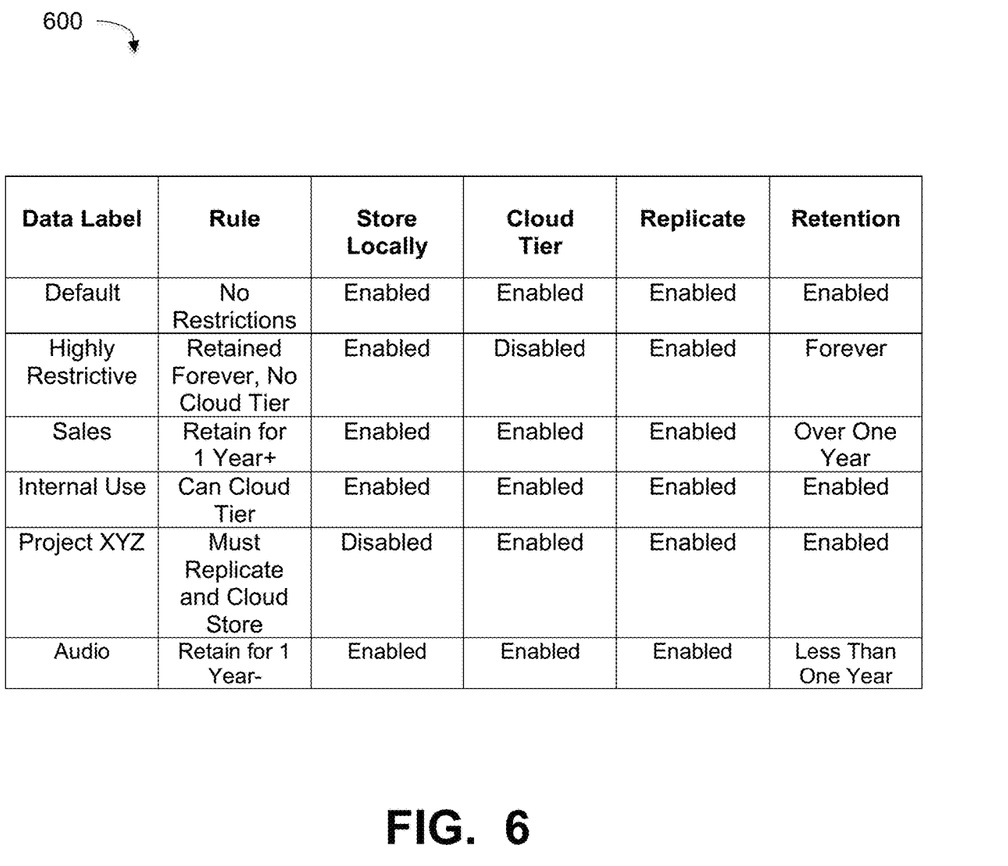
FIG. 6 is an example table of rules in the DLRE could be created by a user or the system.

The rules corresponding to different data labels can be any appropriate rule dictating storage, access, transmission, or other process associated with the saveset data. The rules may be user defined or provided by the system, or a combination of both. FIG. 6 is an example table of rules in the DLRE could be created by a user or the system. In this example table 600, six data labels are created and defined in the data label column, and can be discovered by the backup software. For this example, the labels are "Default," "Highly Restrictive," "Sales," "Internal Use," and "Project XYZ." The labels illustrate the case where the data is classified on the basis of access or control (e.g., highly restrictive), department or user class (e.g., sales), general use (e.g., internal use), specific use (e.g., project xyz), and file type (e.g., Audio). Other basis of labeling can also be applied, such as source, size, age, and so on.

Each label has associated with it a general rule that is described in the Rule column. This rule dictates certain storage and replication/retention parameters. Thus for the example of FIG. 6, default data has a rule that is unrestricted, and thus this data can be stored locally or cloud tiered, and can be replicated and retained at will. Other types of data, such as highly restricted data, is subject to stricter rules, such as it cannot be cloud tiered, and it cannot be deleted, i.e., retained forever.

Figure 7:
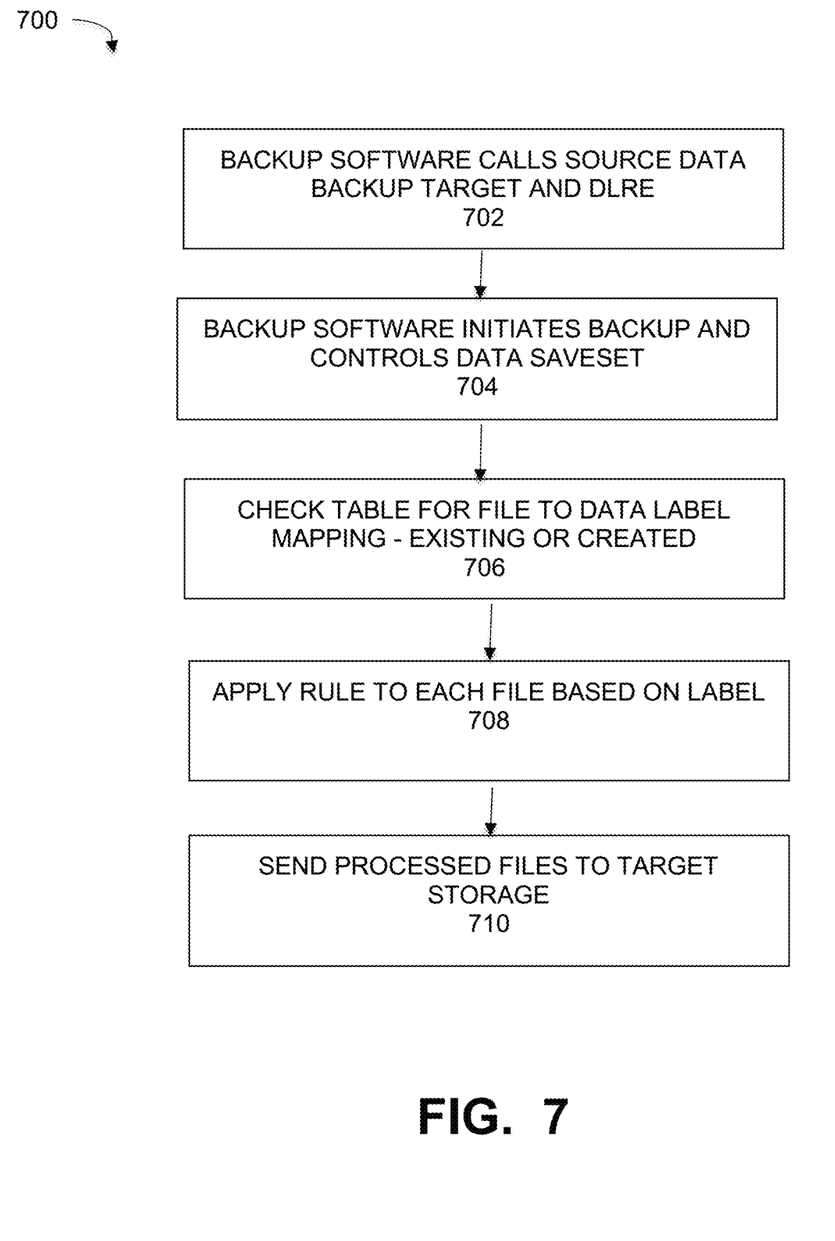
FIG. 7 is a flowchart that illustrates backup workflow for backup software in conjunction with a data labeling process, under some embodiments.

FIG. 7 is a flowchart that illustrates backup workflow for backup software in conjunction with a data labeling process, under some embodiments. In backup workflow 700, the backup software will manage and monitor every component; this includes calling the source data, backup target and DLRE, 702. The backup software initiates the backup and controls the file data to be backed up. For each file the backup software operates on, it will check its own database table for a files-to-data-label mapping that contains existing labels (e.g., user supplied) or DLRE created labels that it discovers, 706. In an embodiment, step 706 maps to process 416 in FIG. 4. For each rule and file, it will follow the rules based on the label in the table, 708. This workflow is done for each file and will continue till all files are processed. When completed, all files will have had all the DLRE rules applied to them, and are then sent to the target storage 710. In an embodiment, step 710 maps to process 420 in FIG. 4.

Although embodiments of FIG. 7 are described with respect to data backup operations, it should be noted that the same workflow applies to data replication, restores, data recovery (DR), and other similar data migration operations.

Multiple Data Labels

As mentioned above, in certain cases, data may fall into or be identifiable by more than one label, and thus be subject to different or conflicting rules. For example, an audio file may be labeled as highly restrictive due to some characteristic that causes the DLRE to label the file with this label. In this example case, there are different rules with respect to retention and cloud tiering. A conflict resolution process would be used to determine the appropriate rules, such as most restrictive rules take precedence, latest label takes precedence, customer-defined specific ordering, and so on. In embodiment, the labels themselves may be prioritized such that they are given precedence based on a specific order, such as highly restrictive above restrictive above default, and so on.

In an embodiment, the data labeling process 120 includes mechanisms to apply possible multiple labels to a file and/or resolve conflicts in cases where potential labels and rules may contradict one another. Unlike a single label based on identified characteristics of a data file, multiple data labels may be assigned to a file and then be used to generate a new label, a hybrid (compound) label, or a single label that is determined through certain conflict resolution rules.

Figure 8:
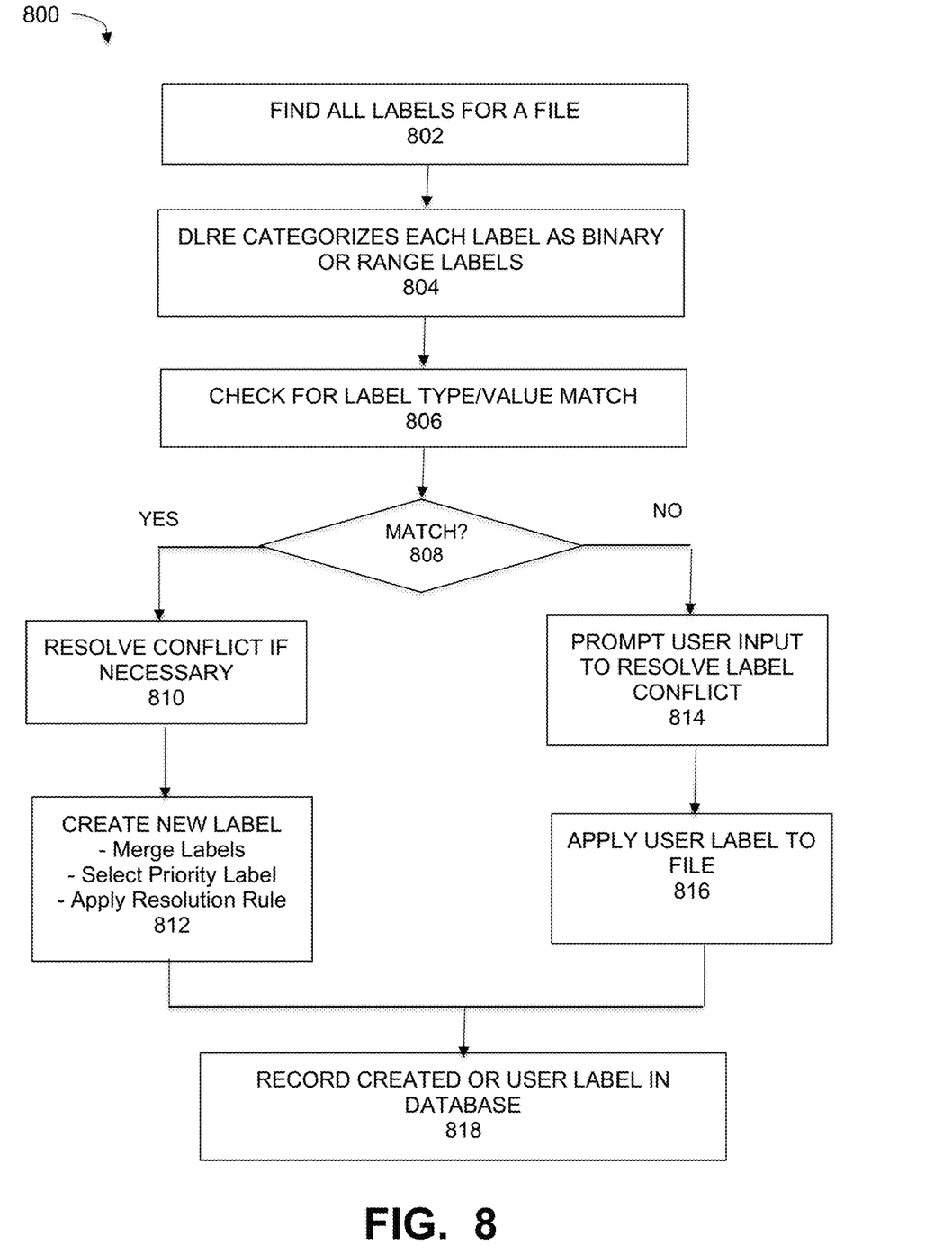
FIG. 8 is a flowchart that illustrates a method of assigning multiple or hybrid labels to a file, under some embodiments.

FIG. 8 is a flowchart that illustrates a method of assigning multiple or hybrid labels to a file, under some embodiments. For the hybrid data labeling embodiment 800 of FIG. 8, process 120 works by finding all labels for each file instead of just one label. Such labels can be from outside/external systems and/or labels that match any number of rules that the user created in the DIRE 502, The DLRE then takes all the labels as inputs and categorizes them, 804. In an embodiment, there are two types of label categories: binary and range. A binary label category is a rule on a label that can only be one value. For example, a 'replicate' label is either yes or no, an 'encrypt' label is either yes or no, and so on. The range label category is more flexible in that its values can be a numerical range such as number of days to retain a backup (e.g., 30, 60, 90 days) or number of replicated copies (e.g., 2, 4, etc.). The range typically has a minimum value of 0 and a maximum value such as 2^64 that represents and infinite range or forever time period.

All of the possible labels thus have an associated category and one or more values. The DLRE checks whether the labels of the file match in terms of type categorization (binary and range) and the associated value, such as binary value, alphanumeric value or range, 806. As determined in decision block 808, for rules that match (e.g., 'replicate' is yes in both or 'retention' equals 30 in both labels), the process will apply any appropriate conflict resolution rules, 810. It will then generate a new label for the file based on the multiple labels. Such a label can be a new label, such as a hybrid or compound label generated by merging labels or parts of labels; it can be a label selected from one of the multiple labels based on a priority or preference scheme; or it can be a label determined by a conflict resolution rule.

For rules that the process is unable to match in step 808, the process will prompt the user to resolve the conflict, 814. For the binary category, the user can choose to override to either 'yes' or 'no', and for the range category, the user can choose the lower value or higher value based on whether they want to be more restrictive or permissive (depending on the rule). For each label resolution, whether created automatically or by the user, the DLRE will record the specific combination of labels (inputs) along with the selected resolution in a local database, 818. This database is then used so that if the DLRE sees the same combination of inputs in the future, it will automatically apply the previous label resolutions.

For example; using FIG. 600 as a sample database: DLRE has identified two labels for a file: Highly Restrictive and Internal Use. From the table it can be seen that the "Store Locally" and "Replication" characteristics can be auto merged/resolved as they have the same value. They would also be considered binary label types. However, the "Cloud Tier" and "Retention" characteristics cannot be auto merged/resolved. In this case, the DLRE would ask the user to manually resolve the conflict. In this example, the DLRE would record the following inputs:

Highly Restrictive Label
Store Locally—Yes
Cloud Tier—No
Replicate—Yes
Retention—Forever
Internal Use Label
Store Locally—Yes
Cloud Tier—Yes
Replicate—Yes
Retention—Enabled The DLRE would compute a score for this very specific combination of inputs. A user setting would allow the DLRE to auto match rules that come close to this score. A score of "100" would mean the DLRE would only match previous rules if they were 100% identical. However a score of "80" would mean the DLRE could match any previous rule that is 80% or higher in similarity.

In general, any method could be used to create a score, so long as it is consistent for the system. If the scoring algorithm changes, then past scores might need be recomputed to use the new algorithm. In example embodiment, a simple scoring algorithm of summation can be used. For binary rules values can be assigned as follows: 1 if they match, 0 if they do not match. For range rules the following equation can be used: ((higher number)−(lower number))/(higher number). The results are added up, divided by the total number of rules, and converted into a percentage (out of 100). The final score is stored in the DLRE and used to help match exact or similar rules.

Under the hybrid label process, only a single label (e.g., "internal use", "highly restrictive", etc.) would be applied to a file. The DIRE will process the fact that a file could match one or more labels. The conflict resolution among the different possible labels will come down to a score of all the inputs (labels) and the input value characteristics (e.g., store locally, cloud tier, etc.). When two files with the same score match, the previous recorded label/action can be used. Scores can be considered unique based on the set of inputs. When scores are similar, they share some input values but not necessarily all of them. The DLRE will alert the user of the similarity and allow the user to resolve the conflict. The DLRE is thus configured to automatically create a new label (e.g., hybrid, merged, or compound) or a label based on the user selection the user provided, or the user can skip creating a new label and choose a label that already exists.

Conflict Resolution and Scoring

With respect to conflict resolution and scoring works, as stated above, a number of different solutions may be used for conflict resolution, such as having the user decide, using previous results, using a default priority, or a combination of these and other resolution mechanisms. In an embodiment, the scoring mechanism is used to help conflict resolution as often as possible to eliminate or at least reduce the need to have the user decide.

With respect to scoring, in an embodiment, each label has a series of rules, and each rule has a type that can either be binary or range (e.g., encryption is binary yes/no and retention length is a range). Each rule thus has a set of properties, such as the name of rule, its type, and its value, along with other similar possible properties. For example: an encryption rule has a named property of "Encryption," and its type is binary and has value of "yes/no". Similarly, retention length has a named property of "Retention," and its type is range and its value of "30 days," for example, Each rule can thus be a data element having the form: Rule [Name, Type, Value]. Other properties may also be included, as appropriate. The process compares two rules to each other for automatic conflict resolution when the name and type match. If the name matches, but type is different, it can still compare the rules by having the user decide on how they want to resolve this particular mis-match. From that, the information is saved to the label catalog.

Figure 9:
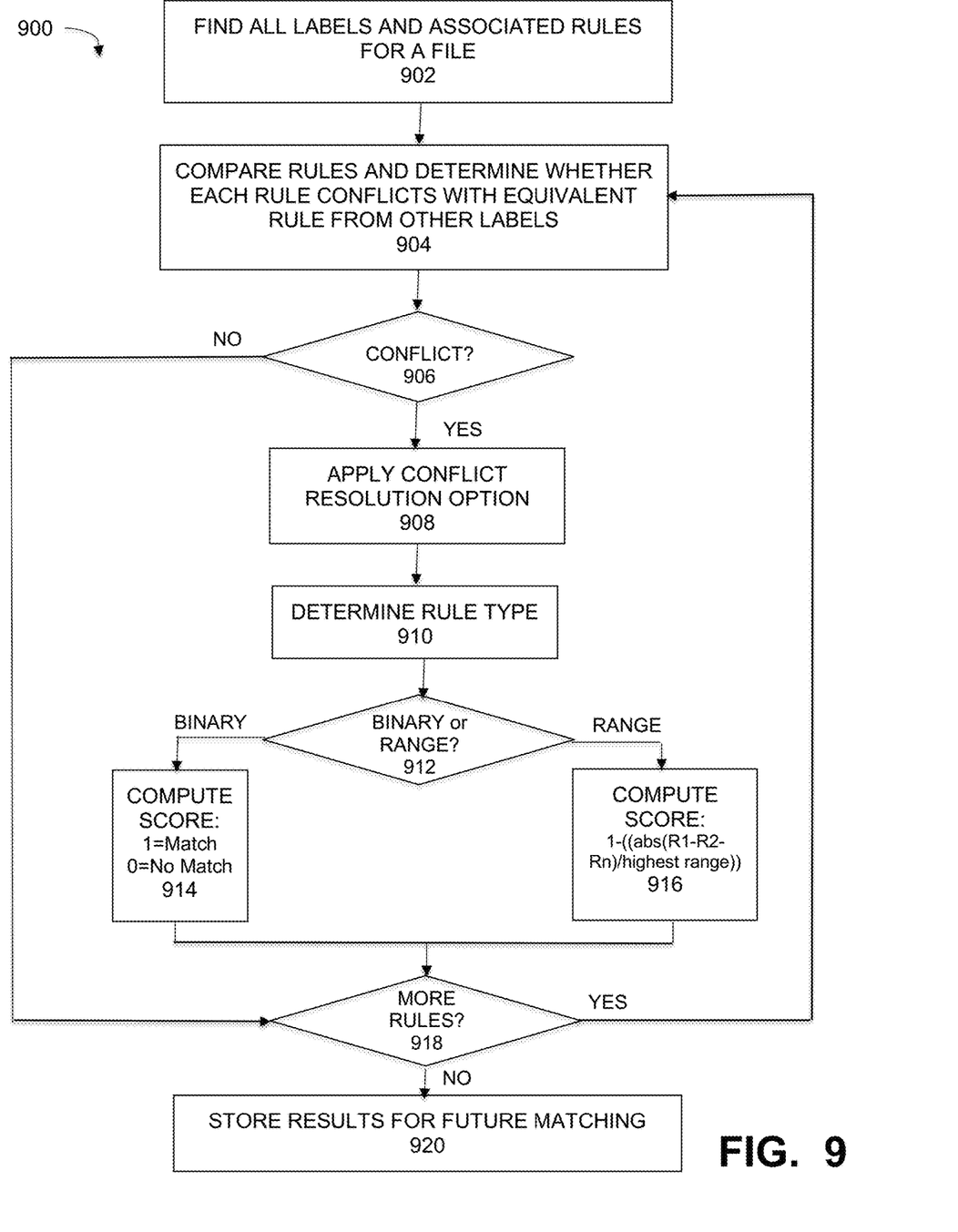
FIG. 9 is a flowchart, that illustrates a method of performing conflict resolution using multiple or hybrid labels, under some embodiments.

FIG. 9 is a flowchart that illustrates a method of performing conflict resolution and scoring using hybrid labels, under some embodiments. In process 900 of FIG. 9, all labels and their associated rules are found for a file, 902. It is then determined whether each rule conflicts with the equivalent rule from other label through a comparison where each rule is compared with each other rule in a pair-wise comparison, 904. When the process compares two or more labels for conflict resolution, it compares each set of properties, per rule. The named property for each rule must match and be of the same type as the other rule in order to compare. For example: two labels with a named property of 'Encryption' that are both binary can be considered for matching. Likewise, if two properties shared the same name but are of different types (e.g., binary vs range), it would be unable to compare this automatically and the user would then be asked to resolve this mismatch conflict.

In step 906 it is determined whether or not there is a conflict between a particular pair of rules. If there is no conflict, the process determines whether there are any more rules to compare, 918. If there are more rules, the process iterates through the comparison step 904. If not, the process ends by storing the results (in this case a match between the two compared rules) for future conflict resolution auto matching, 920, and the process ends.

If there is a conflict for the pair of compared rules, an appropriate conflict resolution option is applied, 908. One of the conflict resolution options may need to be that the user is prompted to select the label, as described above in the case of two non-comparable rules.

When it is possible to match two or more rules from two or more labels, the process computes a score to capture their similarities or differences, which is done using a sample scoring algorithm. In step 910, the process determines the types of the compared rule to determine if they are binary or range-based, 912. For binary rules, if there is a match; a score of 1 is generated; and if they do not match, a score of 0 generated, as shown in step 914. This score not cumulative, but is rather kept as a running tally.

For range scores, the process uses a slightly different algorithm that takes into account all possible values and matches. If two range rules have the same value and same possible range, they receive a score of 1. If they differ, either by value or and possible range, it computes the difference and its value will be between 0 and 1. In an embodiment, the formula can score calculation 916 be written as follows:

$$1-((abs(\text{rule 1}-\text{rule 2}-\text{rule } n)/\text{highest rule range value}))$$

For example, consider two labels with two retention range rules that have different values of 30 days and 90 days, with both having a possible range of 0 days to 360 days. The difference between the two would be 90 days−30 days=60 days. In this case, 60 days out of a range of 360 days would be 0.16666 (60/360) difference, and computing that out as a percentage results in a value of 83.33% similar (1−01666). For the purpose of tallying, score values are kept between 0 and 1, thus the score would be 0.8333.

As another example, consider two labels that have two tiering range rules that determine when data should be tiered to the cloud. One rule has a value of 14 days while another rule has 30 days, with rule 1 having a range of 0 to 14 days while rule 2 having a range of 0 to 360 days. The process would first determine the difference between the two rules which is 16 (30−14). It would then use the highest range value of 360 days as the denominator in the above equation. The final score, for this rule, would be: 0.0444 (16/360) or 4.44% similar.

This scoring step based on rule type is performed for each rule, as determined in step 918. Once each rule has been processed with respect to all of the pair-wise compared rules, the process sums the running tally and then divides that sum by the number of possible rules. This final score is what is used to compare similarity between labels, and the result is stored for future conflict resolution auto matching, 920. Thus, regardless of how conflict resolution is performed, or how the score is computed for similarity, the DLRE 502 will save all the point in time labels, their associated rules and properties along with the result of the conflict resolution. When the DIRE tries to perform conflict resolution it will have a history of past resolutions that it can refer to. If a user determines that a relatively high percent (e.g., 80%) similarity of conflicting labels is good enough, then the DLRE will automatically resolve the conflict based on any such past resolution actions. The past resolutions can be saved in a data structure referred to as a label catalog, and can be a simple database or similar structure.

System Implementation

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Figure 10:
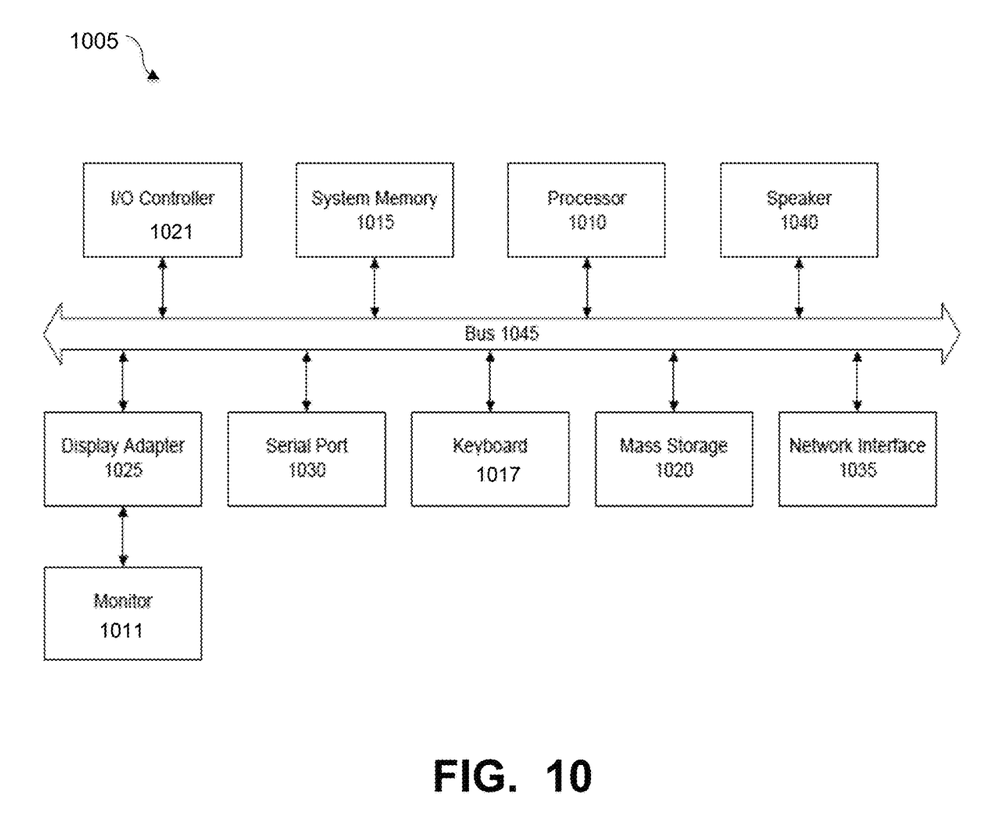
FIG. 10 is a system block diagram of a computer system used to execute one or more software components of a hybrid data labeling process for backup systems, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 10 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 10 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of backing up data in a network, comprising:
   initiating, in a backup component, a backup of a data saveset from a data source to a target storage;
   checking, in a database table, for a data label applied to each file of the saveset, wherein the data label is one of an existing label or a created label provided by a data labeling process and is selected from a plurality of labels, and is based on one or more characteristics of the file including: file type, access, source, age, application, importance, and size;
   defining, by the data labeling process, a storage rule for each label of the plurality of labels and controls; and
   applying, by the backup component, the storage rule for each file of the saveset during the backup, wherein the storage rule dictates at least one of: storage location, access rights, replication periods, and retention periods.

2. The method of claim 1 further comprising identifying characteristics of data in a data saveset to separate the data into defined types based on respective characteristics, wherein the characteristics comprise factors including: file type, access, source, age, application, importance, and size.

3. The method of claim 2 wherein the identifying step comprises performing full content indexing of the dataset using one of an inline or post-process indexing operation, and further wherein the data identifying step comprises using a current name or file extension of each file of the data saveset.

4. The method of claim 3 further comprising:
   identifying patterns in each defined type; and
   defining the identified patterns as regular expressions for storage in a database.

5. The method of claim 4 wherein the patterns are known patterns defined by an industry or customary usage, or are user defined patterns, and further wherein the patterns comprise personal identification information (PII) including name, address, social security number, and phone number.

6. The method of claim 1 further comprising:
   determining whether the data saveset is already labeled;
   using, if so, an existing label instead of an assigned label; and
   saving the existing label as part of a backup catalog.

7. The method of claim 6 further comprising storing the existing label in a location selected from: an extended attributes region of a filesystem of the saveset, within each individual file of the saveset, or in a separate database.

8. The method of claim 1 further comprising:
   defining migration rules for each data label;
   discovering assigned labels during a migration operation; and
   applying respective migration rules to labeled data in the data saveset.

9. The method of claim 8 wherein the migration rules dictate storage location, access rights, replication periods, retention periods, and similar parameters.

10. The method of claim 9 further comprising, discovering, by the migration operation, the existing data label to add it to its own backup catalog that identifies each file with a corresponding data label.

11. The method of claim 10 wherein the migration operation comprises one of: backing up data from a data source to a storage target, replicating data in the network, restoring data from the storage target, and performing disaster recovery operations in the network.

12. A system for migrating data in a network between data sources and target storage, comprising:
- a computing processor;
- a backup component, executed by the computing processor, initiating a backup of a data saveset from a data source to a target storage;
- a database checked by the backup component, executed by the computing processor, for a data label applied to each file of the saveset, wherein the data label is one of an existing label or a created label provided by a data labeling process and is selected from a plurality of labels, and is based on one or more characteristics of the file including: file type, access, source, age, application, importance, and size; and
- a data labeling component, executed by the computing processor, defining a storage rule for each label of the plurality of labels and controls, wherein the backup component applies the storage rule for each file of the saveset during the backup, wherein the storage rule dictates at least one of: storage location, access rights, replication periods, and retention periods.

13. The system of claim 12 wherein the backup hardware processor component identifies characteristics of data in a data saveset to separate the data into defined types based on respective characteristics, wherein the characteristics comprise factors including: file type, access, source, age, application, importance, and size.

14. The system of claim 13 wherein the backup hardware processor component further identifies patterns in each defined type, and defines the identified patterns as regular expressions for storage in a database, wherein the patterns are known patterns defined by an industry or customary usage, or are user defined patterns, and further wherein the patterns comprise personal identification information (PII) including name, address, social security number, and phone number.

15. The system of claim 12 further comprising a data migration component defining migration rules for each data label, discovering assigned labels during a migration operation, and applying respective migration rules to labeled data in the data saveset.

16. The system of claim 15 wherein the migration rules dictate storage location, access rights, replication periods, retention periods, and similar parameters, and wherein the migration operation comprises one of: backing up data from a data source to a storage target, replicating data in the network, restoring data from the storage target, and performing disaster recovery operations in the network.

17. A computer-implemented method of resolving labeling conflicts for categorized and labeled data in a network, comprising:
- finding all labels and associated rules for each file of a plurality of labeled files, wherein a rule is one of a binary type or a range type, and has a set of properties comprising a name, a type, and a value;
- comparing, in a pair-wise fashion for multiple rules, each set of properties for a pair of rules; determining if each property for each of the pair of rules match and are of the same type, and if not requesting user input to resolve a label conflict, otherwise
- computing a first score to represent a degree of similarity between the pair of rules, wherein matching binary rules are assigned a score of 1 and non-matching binary rules are assigned a score of 0, and for range type rules, a second score is calculated as a sum of rule values divided by a highest rule range value;
- maintaining the first and second score each as a running tally for a plurality of rules for labels compared in the pair-wise fashion; and
- summing the running tally of the first and second scores and dividing the running tally by the number of rules to compute a final score for the degree of similarity between labels having the pair of rules.

18. The method of claim 17 further comprising assigning a final label to a file of files for which respective rules properties are compared based on the final score.

19. The method of claim 18 wherein the assigned label is created by selecting one of two or more possible labels based on the final score.

20. The method of claim 17 further comprising:
- saving all the labels having compared rules with their associated rules and properties along with the final score; and
- using the saved labels upon a next occurrence of label conflict resolution as a history of past conflict resolution results.

* * * * *